(12) United States Patent
Cheng

(10) Patent No.: US 6,334,253 B1
(45) Date of Patent: Jan. 1, 2002

(54) ADJUSTABLE WIRE STRIPPER

(76) Inventor: Yin-Ho Cheng, No. 58, Chungshan Rd., Tucheng Industrial Zone, Taipei County (TW)

(*) Notice: Subject to any disclaimer, the term of this patent is extended or adjusted under 35 U.S.C. 154(b) by 0 days.

(21) Appl. No.: 09/648,478

(22) Filed: Aug. 28, 2000

(51) Int. Cl.⁷ .................................................. H02G 1/12
(52) U.S. Cl. ........................ 30/90.7; 30/91.2; 30/90.4; 30/90.1
(58) Field of Search ................................ 30/90.1, 90.4, 30/90.7, 91.2, 90.8, 91.1; 81/9.4, 9.41, 9.44

(56) References Cited

U.S. PATENT DOCUMENTS

| | | | | |
|---|---|---|---|---|
| 3,881,249 A | * | 5/1975 | Cox, Jr. ........................ | 30/90.7 |
| 3,946,487 A | * | 3/1976 | Bieganski .................... | 30/90.7 |
| 4,136,445 A | * | 1/1979 | Grubb ......................... | 30/90.1 |
| 4,449,298 A | * | 5/1984 | Putz ............................ | 30/90.1 |
| 4,472,877 A | * | 9/1984 | Undin et al. ................. | 30/90.7 |
| 4,489,490 A | * | 12/1984 | Michaels et al. ............ | 30/90.1 |
| 4,489,491 A | * | 12/1984 | Gregson ...................... | 30/90.7 |
| 4,526,068 A | * | 7/1985 | Undin et al. ................. | 81/9.4 |
| 4,594,029 A | * | 6/1986 | Michael, III ................. | 30/90.1 |
| 4,955,137 A | * | 9/1990 | Matthews .................... | 30/90.1 |
| 5,265,338 A | * | 11/1993 | Cheng ......................... | 30/90.1 |
| 5,653,027 A | * | 8/1997 | Wall ............................ | 30/90.8 |
| 6,073,349 A | * | 6/2000 | Liversidge .................. | 30/90.7 |

* cited by examiner

Primary Examiner—M. Rachuba
Assistant Examiner—Kim Ngoc Tran
(74) Attorney, Agent, or Firm—Rosenberg, Klein & Lee

(57) ABSTRACT

An adjustable wire stripper includes a housing, a cutter holder revolvably mounted in a top open chamber of the housing and holding a cutter outside the housing for cutting the insulator of an electric wire, a lever adapted to rotate the cutter holder in the housing, a sliding pressure plate mounted in the housing and adapted to hold down the electric wire to be stripped on the cutter of the cutter holder, a sliding push plate slidably mounted in the housing and adapted to push the sliding pressure plate upwards for the loading of the electric wire to be stripped, a tensile spring adapted to pull the sliding push plate downwards in the housing, and an adjustment screw installed in a bottom axle hole of the housing and inserted through a bottom through hole of the sliding push plate and threaded into a female screw of the sliding pressure and adapted for adjusting the pitch between the pressure head of the sliding pressure plate and the cutter of the cutter holder subject to the diameter of the electric wire to be stripped.

1 Claim, 4 Drawing Sheets

ADJUSTABLE WIRE STRIPPER

BACKGROUND OF THE INVENTION

The present invention relates wire strippers, and more particularly to an adjustable wire stripper, which can be conveniently adjusted for cutting the insulator of any of a variety of electric wires of different diameters.

FIG. 6 shows a wire stripper according to the prior art. This structure of wire stripper comprises a housing 6, the housing 6 having a horizontal partition board 61 and a screw hole 611 on the horizontal partition board 61, a cutter holder 7 mounted in the top side of the housing 6 and holding a cutter 71 outside the housing 6, a pressure plate 8 slidably mounted in the housing 6, the pressure plate 8 having a pressure head 81 spaced above the cutter 71 of the cutter holder 7 and a hook 82 near the bottom end thereof, an adjustment screw 9 threaded into the screw hole 611 of the horizontal partition board 61, and a tensile spring 91 connected between the hook 82 of the pressure plate 8 and the top end of the adjustment screw 9. Rotating the adjustment screw 9 causes the pressure plate 8 to be moved upwards or downwards in the housing 6, and therefore the pitch between the pressure head 81 of the pressure plate 8 and the cutter 71 of the cutter holder 7 is relatively adjusted. This structure of wire stripper is still not satisfactory in function. For stripping an electric wire of small diameter, the adjustment screw 9 must be rotated to move the pressure plate 8 downwards. When adjusted, much effort should be employed to the electric wire, enabling the electric wire to be inserted into the gap between the cutter 71 of the cutter holder and the pressure head 81 of the pressure plate 8. Another drawback of this design of wire stripper is that the adjustment screw 9 has a long rear part protruded over the bottom side of the housing 6, which obstructs the sense of beauty of the wire stripper, and may injure the user's hands when the user operating the wire stripper to strip the loaded electric wire. Further, when stripping an electric wire of big diameter, the pitch between the cutter 71 of the cutter holder 7 and the pressure head 81 of the pressure plate 8 must be relatively increased to fit the electric wire to be stripped, in this case, the pressure plate 8 becomes unstable.

SUMMARY OF THE INVENTION

The invention has been accomplished under the circumstances in view. It is one object of the present invention to provide a wire stripper, which can be adjusted to fit electric wires of different diameters. It is another object of the present invention to provide an adjustable wire stripper, which causes a sense of beauty. It is still another object of the present invention to provide an adjustable wire stripper, which can be conveniently adjusted with less effort to fit electric wires of different diameters. To achieve these and other objects of the present invention, there is provided an adjustable wire stripper comprised of a housing, a cutter holder revolvably mounted in a top open chamber of the housing and holding a cutter outside the housing for cutting the insulator of an electric wire, a lever adapted to rotate the cutter holder in the housing, a sliding pressure plate mounted in the housing and adapted to hold down the electric wire to be stripped on the cutter of the cutter holder, a sliding push plate slidably mounted in the housing and adapted to push the sliding pressure plate upwards for the loading of the electric wire to be stripped, a tensile spring adapted to pull the sliding push plate downwards in the housing, and an adjustment screw installed in a bottom axle hole of the housing and inserted through a bottom through hole of the sliding push plate and threaded into a female screw of the sliding pressure and adapted for adjusting the pitch between the pressure head of the sliding pressure plate and the cutter of the cutter holder subject to the diameter of the electric wire to be stripped.

DETAILED DESCRIPTION OF THE PREFERRED EMBODIMENT

Figure 1:
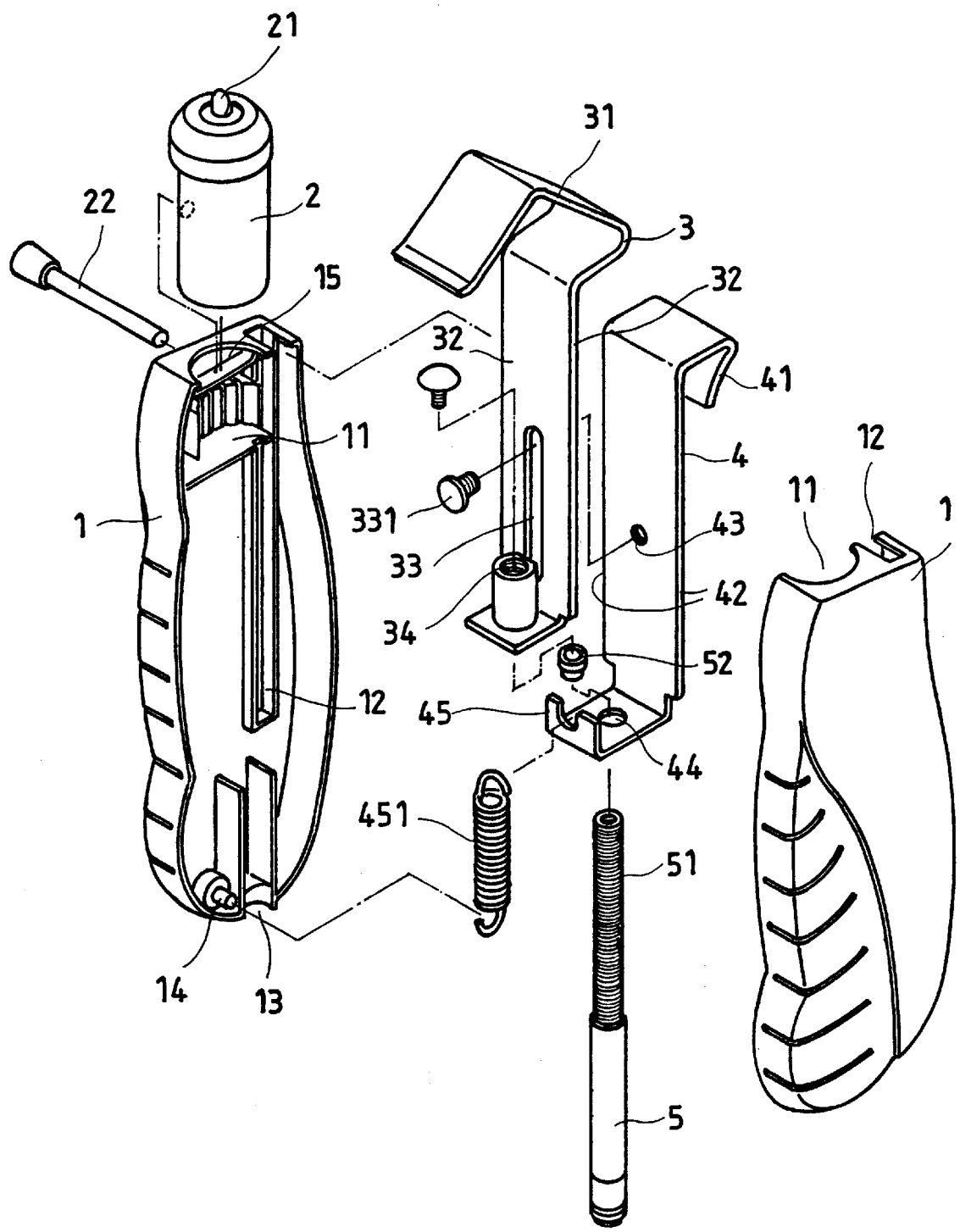
FIG. 1 is an exploded view of an adjustable wire stripper according to the present invention.
Figure 4:
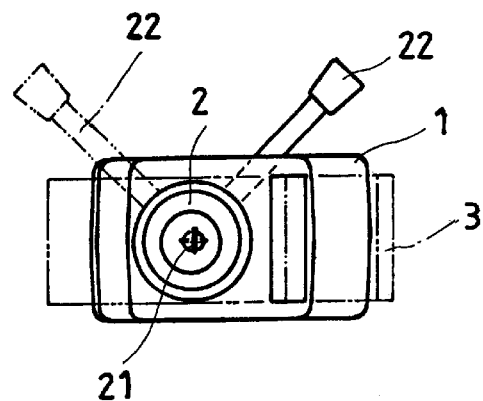
FIG. 4 is a schematic drawing showing the lever shifted between 90° angles according to the present invention.
Figure 2:
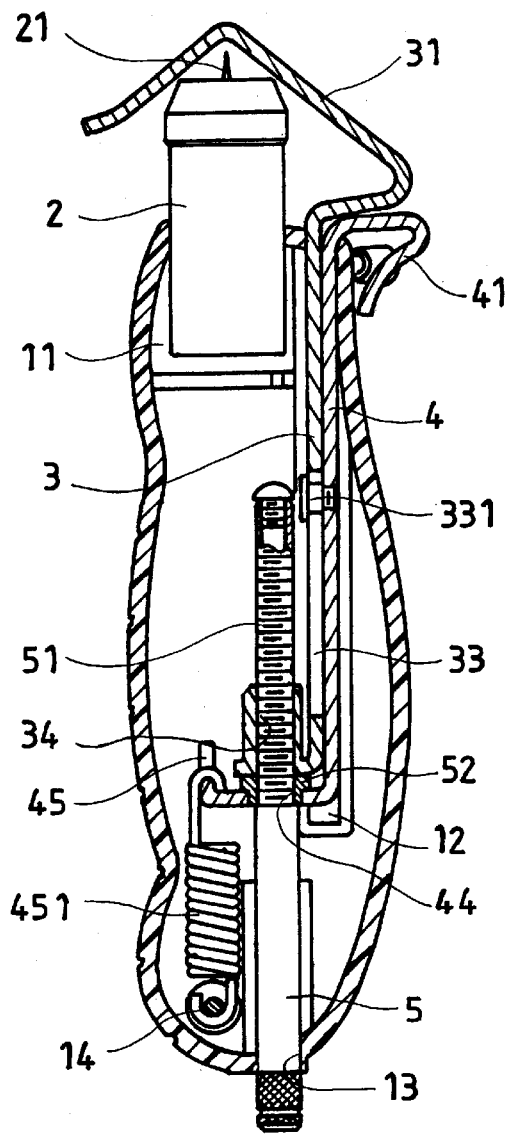
FIG. 2 is a sectional assembly view of the adjustable wire stripper according to the present invention.
Figure 5:
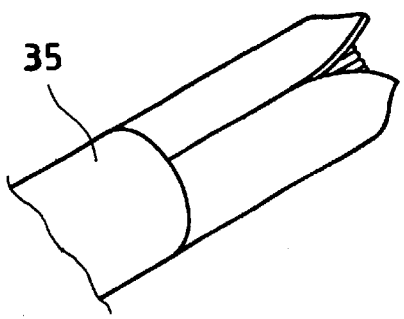
FIG. 5 illustrates the insulator of an electric wire cut transversely and longitudinally according to the present invention.
Figure 3:
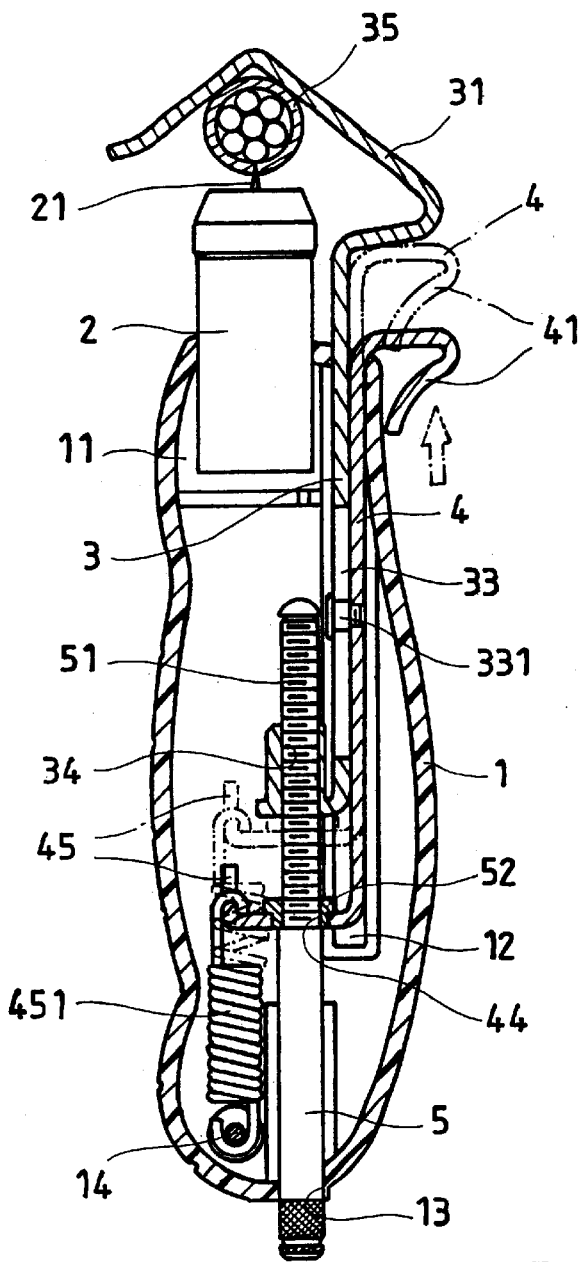
FIG. 3 is a sectional view showing an application example of the present invention.
Figure 6:
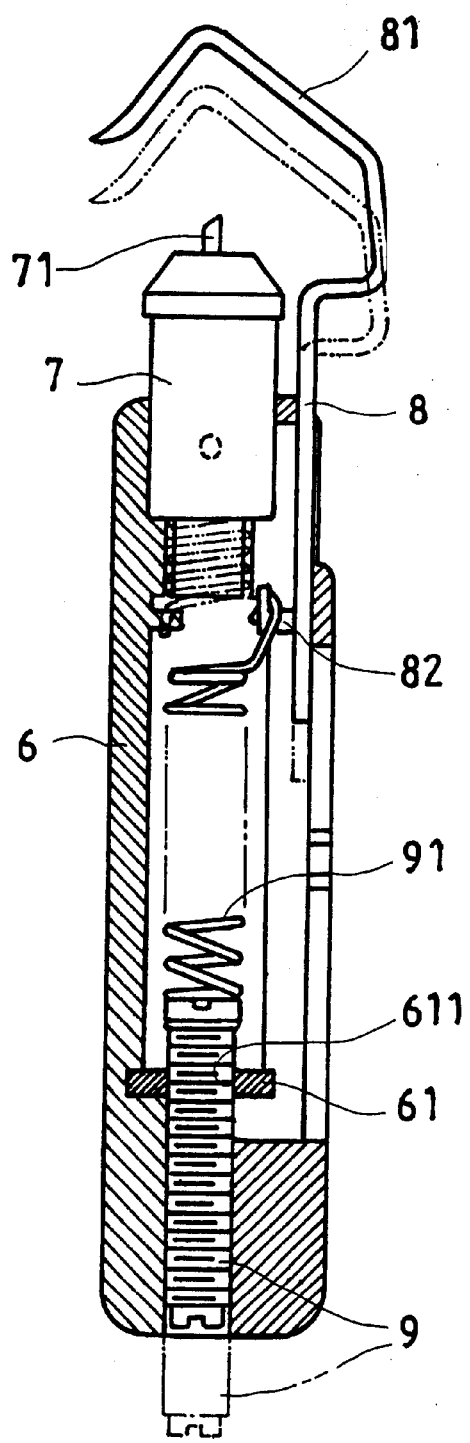
FIG. 6 is a sectional assembly view of a wire stripper according to the prior art.

Referring to FIGS. from 1 through 4, an adjustable wire stripper in accordance with the present invention comprises a housing 1. The housing 1 comprises a top open chamber 11, a horizontal sliding slot 15 disposed at one side of the top open chamber 11, two longitudinal sliding grooves 12 symmetrically bilaterally disposed on the inside and upwardly extended to the outside, a bottom axle hole 13, and a locating rod 14 disposed on the inside adjacent to the bottom axle hole 13. A cutter holder 2 is installed in the top open chamber 11 of the housing 1, holding a cutter 21 outside the housing 1. A lever 22 is connected to the cutter holder 2 and extended out of the horizontal sliding slot 15 of the housing 1, and adapted for operation by hand to rotate the cutter holder 2 in the top open chamber 11 of the housing 1. A sliding pressure plate 3 and a sliding push plate 4 are slidably attached together and moved up and down in the longitudinal sliding grooves 12. The sliding pressure plate 3 and the sliding push plate 4 each have two long sides 32 or 42 respectively coupled to the longitudinal sliding grooves 12. The sliding pressure plate 3 has a longitudinal sliding slot 33. The sliding push plate 43 has a screw hole 43 on the middle, A screw 331 is inserted through the sliding slot 33 of the sliding pressure plate 3 and threaded into the screw hole 43 of the sliding push plate 4 to secure the sliding pressure plate 3 to the sliding push plate 4, enabling the sliding push plate 4 to be moved axially relative to the sliding pressure plate 3 within a limited range equal to the length of the sliding slot 33. The sliding pressure plate 3 comprises a female screw 34 formed integral with an angled bottom end thereof and disposed in parallel to the longitudinal sliding slot 33, and a substantially ^-shaped pressure head 31 at the top side thereof. The sliding push plate 4 further comprises a hooked bottom flange 45 at the bottom side thereof, a vertical through hole 44 through the hooked bottom flange 45, and a push head 41 at the topside thereof. An adjustment screw 5 is inserted through the bottom through hole 13 of the housing 1 and the vertical through hole 44 of the sliding push plate 4, having a threaded shank 51 threaded into the female screw 34 of the sliding pressure plate 3. A bushing 52 is mounted within the vertical through hole 44 around the threaded shank 51 of the adjustment screw 5 to support the adjustment screw 5 in place. Further, a tensile spring 451 is connected between the locating rod 14 of the housing 1 and the hooked bottom flange 45 of the sliding push plate 4. By means of rotating the adjustment screw 5, the distance between the pressure head 31 of the sliding pressure plate 3 and the butter 21 of cutter holder 2 is relatively adjusted subject to the diameter of the electric wire 35 to be stripped. When pushing the sliding push plate 4 upwards with the hand, the pressure head 41 is moved with the sliding push plate 4 to the bottom side of a part of the pressure head 31 of the sliding pressure plate 3, and the sliding pressure plate 3 with the adjustment screw 5 are moved upwards from the housing 1 with the sliding push plate 4 when continuously pushing the sliding push plate 4 upwards. After insertion of the electric wire 35 to be stripped into the space between the cutter 21 of the cutter holder 2 and the pressure head 31 of the sliding pressure plate 3, the sliding pressure plate 4 is released from the hand, enabling the sliding pressure plate 4 to be pulled downwards by the tensile spring 451, and therefore the pressure head 31 of the sliding pressure plate 3 is pressed on the electric wire 35 against the cutter 21 of the cutter holder 2. At this time, the adjustable wire stripper is rotated relative to the electric wire 35, causing the cutter 21 to cut into the insulator of the electric wire 35 in transverse direction. In case the user rotates the lever 22 through 90° angles and then moves the adjustable wire stripper in longitudinal direction, the cutter 21 is forced to cut into the insulator of the electric wire 35 in longitudinal direction.

As indicated above, the user can rotate the adjustment screw 5 to adjust the pitch between the cutter 21 of the cutter holder 2 and the pressure head 31 of the sliding pressure plate 3, so as to fit electric wires of different diameters.

While only one embodiment of the present invention has been shown and described, it will be understood that various modifications and changes could be made thereunto without departing from the spirit and scope of the invention disclosed.

What the invention claimed is:

1. An adjustable wire stripper comprising:
   - a housing, said housing comprising top open chamber, a horizontal sliding slot disposed at one side of said top open chamber, two longitudinal sliding grooves symmetrically bilaterally disposed on the inside and upwardly extended to the outside of the housing, a bottom axle hole, and a locating rod disposed on the inside adjacent to said bottom axle hole;
   - a cutter holder mounted in the top open chamber of said housing, said cutter holder holding a cutter outside said housing for cutting the insulator of an electric wire;
   - a lever connected to said cutter holder and extended out of the horizontal sliding slot of said housing, and adapted for operation by hand to rotate said cutter holder in the top open chamber of said housing;
   - a sliding pressure plate mounted in said housing and moved up and down along the longitudinal sliding grooves of said housing, said sliding pressure plate comprising a longitudinal sliding slot on the middle, a female screw formed integral with an angled bottom end thereof and disposed in parallel to the longitudinal sliding slot of said sliding pressure plate, and a substantially ^-shaped pressure head extended out of said housing and spaced above the cutter of said cutter holder;
   - a sliding push plate mounted in said housing and moved up and down along the longitudinal sliding grooves of said housing and adapted to push said sliding pressure plate upwards, said sliding push plate comprising a screw hole on the middle, a hooked bottom flange at a bottom side thereof, a vertical through hole through said hooked bottom flange, and a push head disposed at a top side thereof and adapted to push said sliding pressure plate upwards upon upward movement of said sliding push plate;
   - a screw inserted through the longitudinal sliding slot of said sliding pressure plate and threaded into the screw hole of said sliding push plate to secure said sliding pressure plate to said sliding push plate, for enabling said sliding push plate to be moved axially relative to said sliding pressure plate within a limited range;
   - an adjustment screw inserted through the bottom axle hole of said housing and the vertical through hole of said sliding push plate and threaded into the female screw of said sliding pressure plate for rotating by hand to move said sliding pressure plate relative to said cutter holder;
   - a bushing mounted within the vertical through hole of said sliding push plate around said adjustment screw to support said adjustment screw in place; and
   - a tensile spring connected between said locating rod of said housing and the hooked bottom flange of said sliding push plate.

* * * * *